(12) United States Patent
Charier (10) Patent No.: US 12,466,543 B2
(45) Date of Patent: Nov. 11, 2025

(54) TURBINE ENGINE MODULE EQUIPPED WITH A PROPELLER AND STATOR VANES SUPPORTED BY RETAINING MEANS AND CORRESPONDING TURBINE ENGINE

(71) Applicant: SAFRAN AIRCRAFT ENGINES, Paris (FR)

(72) Inventor: Gilles Alain Marie Charier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 82 days.

(21) Appl. No.: 18/005,948

(22) PCT Filed: Jul. 21, 2021

(86) PCT No.: PCT/FR2021/051361
§ 371 (c)(1),
(2) Date: Jan. 18, 2023

(87) PCT Pub. No.: WO2022/018380
PCT Pub. Date: Jan. 27, 2022

(65) Prior Publication Data
US 2023/0271695 A1    Aug. 31, 2023

(30) Foreign Application Priority Data
Jul. 23, 2020    (FR) ...................................... 2007783

(51) Int. Cl.
*B64C 11/00*    (2006.01)
*B64C 11/32*    (2006.01)
(Continued)

(52) U.S. Cl.
CPC ............ *B64C 11/008* (2013.01); *B64C 11/32* (2013.01); *B64D 15/04* (2013.01); *F01D 9/065* (2013.01);
(Continued)

(58) Field of Classification Search
CPC ........ F01D 17/162; F01D 25/04; F01D 25/06; F01D 5/16; F01D 5/26; F01D 25/02;
(Continued)

(56) References Cited

U.S. PATENT DOCUMENTS

| 4,856,962 A * | 8/1989 | McDow | ................ F01D 17/162 415/161 |
| 2002/0061249 A1 * | 5/2002 | Caubet | .................... F01D 5/143 415/160 |

(Continued)

FOREIGN PATENT DOCUMENTS

| FR | 3082230 A1 | 12/2019 |
| FR | 3083207 A1 | 1/2020 |

OTHER PUBLICATIONS

English machine translation of FR 3082230A1, Aug. 2, 2024.*
(Continued)

*Primary Examiner* — Christopher Verdier
(74) *Attorney, Agent, or Firm* — WOMBLE BOND DICKINSON (US) LLP (57) ABSTRACT

A turbine engine module having longitudinal axis X including an unducted propeller for rotating about the longitudinal axis X; —at least one flow straightener with a plurality of stator vanes extends substantially along a radial axis Z, each stator vane having a root and a blade rising radially from the root; and—a pitch change system for changing the pitch of the stator vanes. At least two adjacent stator vanes are connected to each other by at least one retaining member coupled to the blades of the stator vanes by at least one pivot shaft and mounted radially from the root of the stator vanes. The pivot shaft extends along a pivot axis B coaxial with the pitch adjustment axis A to enable the stator vanes to pivot about the pivot axis B. An antivibration unit dampens vibration of the pivot shaft.

16 Claims, 5 Drawing Sheets

(51) Int. Cl.
*B64D 15/04* (2006.01)
*B64D 27/00* (2006.01)
*B64D 33/02* (2006.01)
*F01D 5/26* (2006.01)
*F01D 9/06* (2006.01)
*F01D 17/16* (2006.01)
*F01D 25/02* (2006.01)
*F01D 25/04* (2006.01)
*F01D 25/06* (2006.01)
*F02C 7/047* (2006.01)
*F04D 29/56* (2006.01)

(52) U.S. Cl.
CPC ........... *F01D 17/162* (2013.01); *F01D 25/02* (2013.01); *F01D 25/04* (2013.01); *F02C 7/047* (2013.01); *F04D 29/563* (2013.01); *B64D 2027/005* (2013.01); *B64D 2033/0233* (2013.01); *F01D 5/26* (2013.01); *F01D 25/06* (2013.01); *F05D 2260/96* (2013.01)

(58) Field of Classification Search
CPC ................. F01D 9/065; F05D 2260/96; F05D 2220/324; F05D 2220/325; B64C 11/008; B64C 11/32; B64D 2027/005; B64D 15/04; B64D 2033/0233; F04D 29/563; F04D 27/002; F02C 7/047
See application file for complete search history.

(56) References Cited

U.S. PATENT DOCUMENTS

| | | | |
|---|---|---|---|
| 2010/0014977 A1 | 1/2010 | Shattuck | |
| 2013/0195651 A1* | 8/2013 | Dube | F01D 25/164 |
| | | | 416/1 |
| 2016/0333734 A1 | 11/2016 | Bowden et al. | |
| 2016/0341068 A1* | 11/2016 | Robertson, Jr. | F01D 9/041 |
| 2017/0102006 A1 | 4/2017 | Miller et al. | |
| 2021/0108597 A1* | 4/2021 | Ostdiek | F02K 1/34 |

OTHER PUBLICATIONS

International Preliminary Report on Patentability received for PCT Patent Application No. PCT/FR2021/051361, mailed on Feb. 2, 2023, 12 pages (4 pages of English Translation and 8 pages of Original Document).

International Search Report and Written Opinion received for PCT Application No. PCT/FR2021/051361, mailed on Oct. 22, 2021, 15 pages (6 pages of English Translation and 9 pages of Original Document).

* cited by examiner

TURBINE ENGINE MODULE EQUIPPED WITH A PROPELLER AND STATOR VANES SUPPORTED BY RETAINING MEANS AND CORRESPONDING TURBINE ENGINE

TECHNICAL SCOPE OF THE INVENTION

The present invention relates to the field of turbine engines. In particular, a turbine engine module comprising an unducted propeller and a flow straightener with stator vanes. It also relates to the corresponding turbine engine.

TECHNICAL BACKGROUND

Turbine engines with at least one unducted propeller are known as "open rotor" or "unducted fan". In this category of turbine engine, there are those with two unducted and counter-rotating propellers (known by the acronym UDF for "Unducted Dual Fan") or those with a single unducted propeller and a flow straightener comprising several stator vanes (known by the acronym USF for "Unducted Single Fan"). The propeller(s) forming the propulsion part can be placed at the back of the gas generator (or engine) so as to be of the pusher type or at the front of the gas generator so as to be of the pulling type. These turbine engines are turboprop engines that differ from turbojet engines by the use of a propeller outside the nacelle (unducted) instead of an inner fan. This allows to increase the bypass ratio significantly without being penalized by the weight of the casings or nacelles designed to surround the blades of the propeller or fan.

The stator vanes of the flow straightener are generally installed on an inlet casing which carries the splitter nose of the primary and secondary flow circulating respectively in a primary vein and around the inlet casing. The stator vanes extend from the inlet casing and are advantageously variable in pitch. These stator vanes also have a large diameter of around 1 meter, or even 1.20 meters, which makes it difficult to fit the pivoting roots of the stator vanes into their housings and to retain them mechanically under vibratory stress. The vibrations can lead to the blocking of the pivoting axes or to the breakage of the stator vane itself or of surrounding members.

SUMMARY OF THE INVENTION

The objective of the present invention is to provide a turbine engine module equipped with stator vanes having an improved mechanical stability while being economical.

We achieve this objective in accordance with the invention by means of a turbine engine module with longitudinal axis X, comprising:
  an unducted propeller intended to be driven in rotation about the longitudinal axis X,
  at least one flow straightener comprising a plurality of stator vanes extending substantially along a radial axis Z, each stator vane comprising a root and a blade rising radially from the root, and
  a system for changing the pitch of the blades of the stator vanes about a pitch axis A that passes through the root of each stator vane,
  at least two adjacent stator vanes being connected to each other by at least one retaining member which is coupled to the blades of the stator vanes by at least one pivot shaft and which is mounted radially at a distance from the root of the stator vanes, said pivot shaft extending along a pivot axis B coaxial with the pitch axis A and being intended to allow the stator vanes to pivot about the pivot axis B, and in that the turbine engine module comprises anti-vibration means for damping vibration of the pivot shaft.

Thus, this solution achieves the above-mentioned objective. In particular, installing this retaining member at least between two adjacent stator vanes and the anti-vibration means of the pivot shaft of the vanes improves the mechanical strength of the vanes. More precisely, the root pivoting about the pitch axis and the retaining member which, on the one hand, connects the stator vanes at least two by two and, on the other hand, is radially distant from the pivoting root of the vanes, generate an effective retaining of the stator vanes. This configuration also reduces the transmission of vibrations from the root of the vanes to their free ends. The assembly is then more rigid.

The module also includes one or more of the following features, taken alone or in combination:
  the pivot shaft is configured to allow the stator vanes to pivot relative to the retaining member.
  the retaining member comprises at least one housing in which the pivot shaft is mounted, at least one guide bearing for the rotation of the pivot shaft and the anti-vibration means which are arranged between an inner surface of the housing and the guide bearing.
  the anti-vibration means comprise an elastic annulus centered on the pivot axis B of the pivot shaft.
  the pitch axis A is inclined with respect to the radial axis Z.
  the pivot shaft passes at least in part through the blade of each stator vane along the pitch axis A.
  the pivot shaft is arranged at a radially outer end of each blade.
  the retaining member is annular and extends about the longitudinal axis X.
  the retaining member is connected to an inlet casing of the turbine engine module by a plurality of arms which are distributed about the longitudinal axis X.
  the turbine engine module comprises a de-icing device for at least the pivot axis B of the pivot shaft, the de-icing device comprising at least one hot air conveying pipe intended to take hot air from a primary vein of the turbine engine, the conveying pipe extending at least in part inside the retaining member.
  each blade comprises a notch which is formed in the blade, the notch comprising a bottom and opening onto a trailing edge, the pivot shaft extending into the notch along the pivot axis B.
  the flow straightener is arranged downstream of the propeller.
  the stator vanes have a radial height that is smaller than a radial height of the vanes of the propeller.

The invention further relates to an aircraft turbine engine comprising at least one turbine engine module having any one of the foregoing features.

BRIEF DESCRIPTION OF THE FIGURES

The invention will be better understood, and other purposes, details, features and advantages thereof will become clearer upon reading the following detailed explanatory description of embodiments of the invention given as purely illustrative and non-limiting examples, with reference to the attached schematic drawings in which.

DETAILED DESCRIPTION OF THE INVENTION

Figure 1:
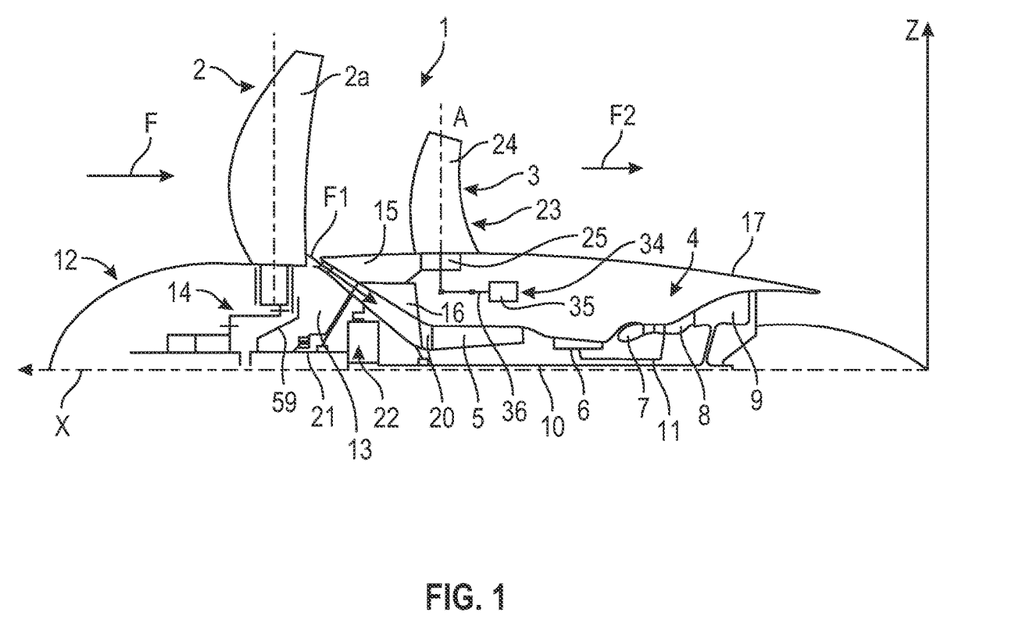
FIG. 1 is a schematic view, in axial and partial section, of an example of a turbine engine with a single unducted propeller and a flow straightener to which the invention applies.

The invention applies to a turbine engine 1 comprising a single unducted propeller 2 and an unducted flow straightener 3. The turbine engine is intended to be mounted on an aircraft. Such a turbine engine is a turboprop engine as shown in FIG. 1. This turbine engine is known by the English expression "Unducted Single Fan" as explained above. Of course, the invention is applicable to other types of turbine engine.

In the present invention, and in general, the terms "upstream", "downstream", "axial" and "axially" are defined in relation to the flow of gases in the turbine engine and here along the longitudinal axis X (and even from left to right in FIG. 1). Similarly, the terms "radial", "inner" and "outer" are defined with respect to a radial axis Z perpendicular to the longitudinal axis X and with respect to the distance from the longitudinal axis X.

In FIG. 1, the turbine engine 1 comprises a gas generator 4 which typically comprises, from upstream to downstream, a low-pressure compressor 5, a high-pressure compressor 6, a combustion chamber 7, a high-pressure turbine 8 and a low-pressure turbine 9. The low-pressure compressor 5 and the low-pressure turbine 9 are mechanically connected by a low-pressure shaft 10 so as to form a low-pressure body.

The high-pressure compressor 6 and the high-pressure turbine 8 are mechanically connected by a high-pressure shaft 11 to form a high-pressure body. The low-pressure shaft 10 extends at least partially within the high-pressure shaft 11 and is coaxial with the longitudinal axis X.

In another configuration not shown, the weak pressure or low-pressure body includes the low-pressure compressor which is connected to an intermediate pressure turbine. A free power turbine is mounted downstream of the intermediate pressure turbine and is connected to the propeller described below via a power transmission shaft to drive it in rotation.

The unducted propeller 2 is formed by a ring of movable blades 2a that extend from a rotating casing 12 that is centered and movable in rotation about the longitudinal axis X. The rotating casing 12 is movably mounted with respect to an inner casing 13 that extends downstream of the rotating casing 12. In the example shown in FIG. 1, the propeller 2 is mounted upstream of the gas generator 4 (puller configuration). Alternatively, the propeller 2 is mounted downstream of the gas generator 4 (pusher configuration). The blades 2a of the propeller 2 can be variable in pitch by means of a pitch change system 14.

An air flow F that passes through the turbine engine 1 divides into a primary air flow F1 and a secondary air flow F2 at the level of a separation nozzle 15. The latter is carried by an inlet casing 16 centered on the longitudinal axis. The rotating casing 12 is also movably mounted relative to the inlet casing 16. The latter is extended downstream by an outer casing or inter-vein casing 17. In particular, the inlet casing 16 comprises a radially inner shell 18 and a radially outer shell 19 (see FIG. 2) which are centered on the axis X and which form, respectively, the radially inner and outer walls of the primary vein 20 in which the primary air flow F1 circulates. A plurality of structural arms 21 extends radially between the radially inner shell 18 and the radially outer shell 19.

The power shaft or the low-pressure shaft 10 (respectively of the free power turbine and the low-pressure turbine) drives the propeller 2 which compresses the air flow outside the outer casing 17 and provides most of the thrust. Eventually, a speed reducer 22 is interposed between the propeller 2 and the power shaft as shown in FIG. 1. The speed reducer 22 may be of the planetary gear or epicyclic gear type.

Figure 2:
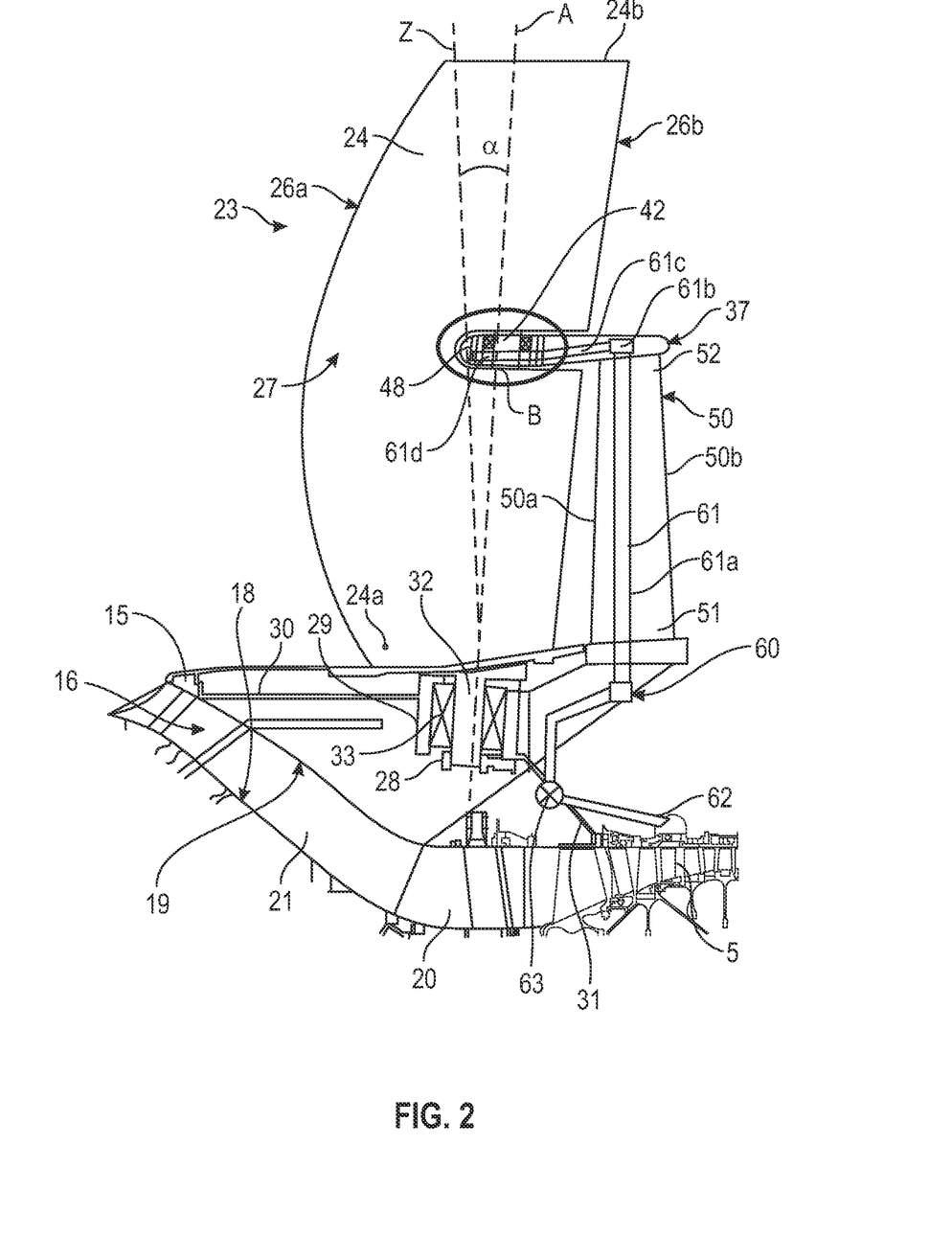
FIG. 2 shows, in partial and axial section, an example of the embodiment of retaining means of a flow straightener mounted downstream of a propeller of a turbine engine module according to the invention.

With reference to FIGS. 1 and 2, the flow straightener 3 is disposed downstream of the propeller 2. The flow straightener 3 comprises a plurality of stator vanes 23 (or fixed vanes) known by the acronym "OGV" for Outlet Guide Vane. The stator vanes 23 are evenly distributed about the longitudinal axis X and extend radially into the secondary air flow F2. The stator vanes 23 of the flow straightener 3 are arranged downstream of the blades 2a of the propeller 2 so as to rectify the air flow generated by them.

The various elements described above are assembled and/or manufactured in a modular manner so as to make them easier to manufacture and to facilitate their maintenance. Here, we mean by turbine engine module, a module that includes at least a propeller and a flow straightener.

According to the example, the blades of the stator vanes 23 of this module have a height substantially along the radial axis which is less than that of the blades 2a of the propeller 2. In this way, the stator vanes can straighten the flow created by the propeller 2 upstream while reducing drag and not being too heavy. The stator vanes 23 have a height along the radial axis that is between 30% and 90% of the radial height of the propeller blades 2.

Each stator vane 23 comprises a blade 24 that extends radially from a root 25. The blades 24 also each include an axially opposed leading edge 26a and trailing edge 26b. The leading and trailing edges 26a, 26b are connected by transversely opposing pressure side and suction side surfaces 27. There are between six and eight stator vanes 23 around the inlet casing 16.

Advantageously, the stator vanes 23 are variable pitch so as to optimize the performance of the turbine engine. A second pitch change system 34 which is mounted in the turbine engine, and in particular in the outer casing 17, is connected to the blades of the stator vanes 23 so as to allow them to pivot about their pitch axes. To this end, as can be seen in FIG. 2, each root 25 of stator vane 23 is mounted in an inner housing 28 which is formed in a sleeve 29. The latter is carried by an annulus which is rigidly fixed to the inlet casing 16 upstream by a first tab 30 and downstream by a second tab 31. Each sleeve 29 is cylindrical and extends substantially along the radial axis. The sleeves and tabs 30, 31 are integral. Alternatively, the sleeves 29 and tabs 30, 31 are manufactured separately and then assembled to form a one-piece assembly.

With reference to FIG. 2, we can see that the root 25 of each vane 23 is typically in the form of a pivot 32 that is pivotally mounted along a pitch axis A in the inner housing 28 of the sleeve 29. The pivot 32 of the root 25 is pivotally mounted by means of at least one guide bearing 33 which ensures the retention of the pivot 32 in the inner housing 28 of each sleeve 29. Two guide bearings can be mounted in the housing 28 and in a superimposed manner along the pitch axis A. The bearing(s) is/are preferably, but not limited to, rolling bearings.

The pitch change system 34 comprises at least one control means 35 and at least one connecting mechanism 36 which are schematically shown in FIG. 1. The connecting mechanism 36 is connected on the one hand to each root 25 of a vane 24 and to the control means 35 on the other hand. The pivot 32, which passes through the sleeve 29 on either side along the pitch axis A, comprises an inner end with an eccentric which is connected to the end of a connecting rod (not shown) of the connecting mechanism 36. The latter comprises a plurality of connecting rods, one end of each of which is connected to a vane root. The other end of each connecting rod is connected to a movable member of the control means which can be a hydraulic or pneumatic cylinder.

As also illustrated in FIG. 2, the pitch axis A is inclined with respect to the radial axis Z. The angle of inclination is between 5° and 45°. Advantageously, the pitch axis is inclined downstream. Such an inclination allows the pitch of the stator vanes to have a suitable aerodynamic effect over the entire radial height of the stator vanes 23.

Figure 3:
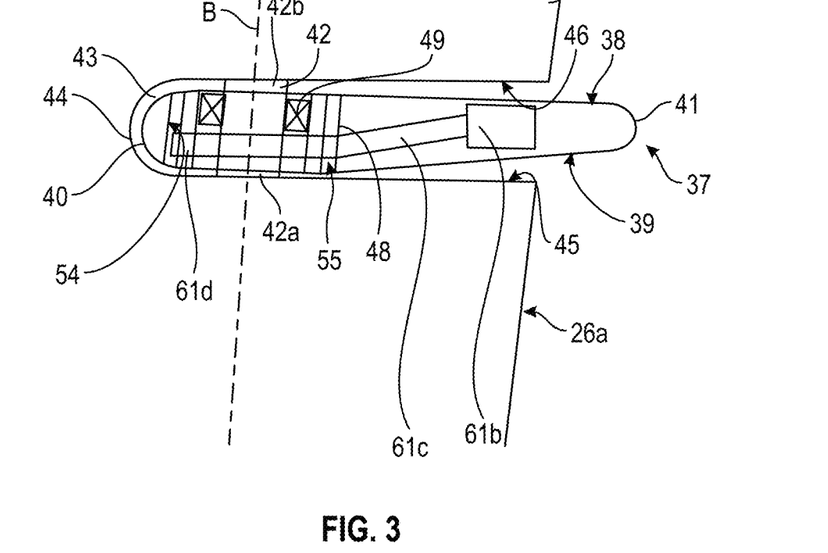
FIG. 3 illustrates in greater detail the connecting means of the blade of a flow straightener vane with the retaining means according to FIG. 2.

According to the embodiment of FIGS. 2 and 3, the retaining means are intended to ensure the mechanical strength of the stator vanes 23. The retaining means are coupled to the stator vanes 23 via at least one pivot connection. In particular, at least one blade 24 of stator vane pivots with respect to a retaining member 37 allowing its stability during its pivoting and during the operation of the turbine engine. The retaining member 37 extends at least between two adjacent stator vanes 23 along a circumferential direction. The retaining member 37 is mounted radially away from the root 25 of the stator vanes, which is traversed by the pitch axis A. Advantageously, but not restrictively, the retaining member 37 is annular and extends about the longitudinal axis X (360°). In this way, the stator vanes 23 are each held, on the one hand, at the level of the roots and, on the other hand, at the level of a portion of the blade by the retaining member 37.

The retaining member 37 is in the form of a shell which has an aerodynamic cross-sectional shape, for example of the NACA type. The retaining member 37 comprises an outer surface 38 and an inner surface 39 which are connected on the one hand by a first edge 40 and on the other hand by a second edge 41.

Each blade 24 pivots by means of a pivot shaft 42, the pivot axis B of which is here coaxial with the pitch axis A and extends at least partially into the blade 24. Each blade 24 comprises a notch 43 that is located in this example about halfway up the blade (along the height of the blade measured between its radially inner end 24a and its radially outer free end 24b). The notch 43 extends substantially axially from a bottom 44 and the trailing edge 26b of the blade 24. Specifically, the notch 43 opens onto the trailing edge 26b, but also transversely onto the pressure side surface 27 and the suction side surface of the blade 24. In FIG. 3, we see that the notch 43 comprises a radially inner wall 45 and a radially outer wall 46 that are opposite and spaced substantially along the radial axis. The bottom 44 is elongated by the radially inner and outer walls 45, 46. The pivot shaft 42 extends between the radially inner wall 45 and the radially outer wall 46 along the pitch axis A. The first edge 40 of the retaining member 37 is opposite and spaced from the bottom 44 of the notch 4. Conversely, the second edge extends outside the notch 43 and is axially offset from the trailing edge 26b of the blade 24. Similarly, the surfaces 38, 39 of the retaining member are spaced from the radially inner and outer walls 45, 46 so that pivoting of the blade is easily accomplished.

Each pivot shaft 42 includes a first end 42a that is integral with the radially inner wall 45 and a second end 42b that is integral with the radially outer wall 46. The pivot shaft 42 and the blade 24 may be made as a single piece (integral).

Figure 4:
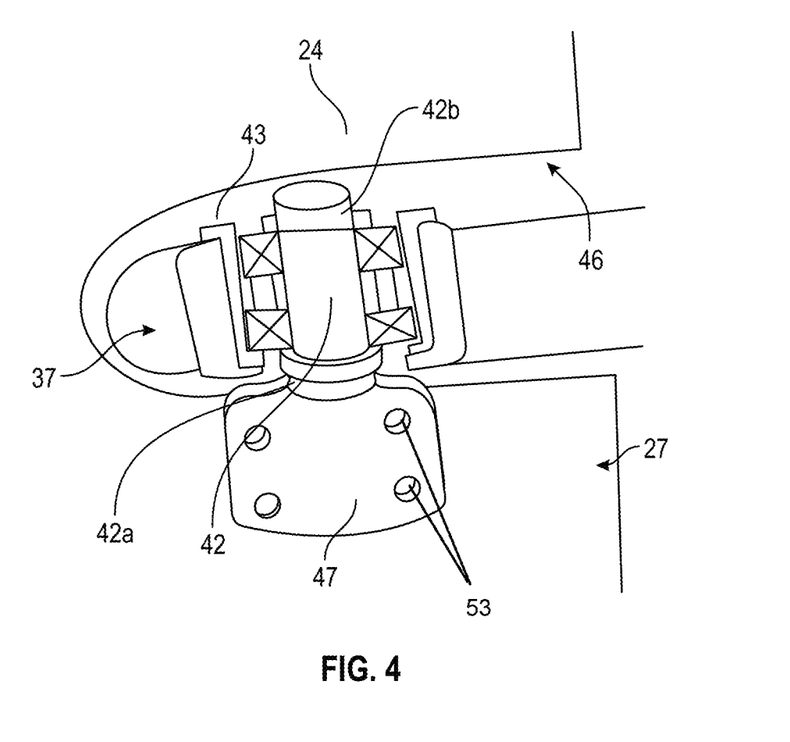
FIG. 4 is an alternative embodiment of mounting a pivot shaft on a blade of a stator vane so as to allow the blade of a stator vane to pivot and to be retained according to the invention.

FIG. 4 illustrates an alternative embodiment of the retaining means for retaining the stator vanes 23. The elements identical or substantially identical to those presented previously and/or with the same functions are represented by the same numerical references. Each blade 24 pivots thanks to a pivot shaft 42 as well. The latter comprises at its first end 42a at least one plate 47 which is fixed on a pressure side surface 27 and/or suction side surface of the blade 24. The plate 47 is fixed by means of fasteners such as screws 53 or by welding. The pivot axis B is in this case offset from the plane in which the plate 47 is defined so that the pivot shaft 42 is inside the notch 43. The second end 42b of the pivot shaft 42 is free and at a distance from the radially outer wall 46 of the blade 24. Of course, the second end 42b may be attached to the blade via a plate and the first end may be free. Similarly, the first and second ends 42a, 42b of the pivot shaft 42 may each be carried by at least one plate that is attached to the pressure surface and/or the suction surface of the blade of the stator vanes 23.

In more detail in FIG. 3, the retaining member 37 comprises at least one housing 48 in which the pivot shaft 42 is mounted. The housing 48 is formed by a bore extending through the wall of the retaining member 37 on both sides and substantially along the pitch axis A (substantially along the radial axis Z). In other words, the pivot shaft 42 passes through the housing 48. The latter is cylindrical with an axis coaxial to that of the pivot shaft 42. The pivot shaft 42 is guided in rotation by means of at least one guide bearing 49. Preferably, the guide bearing 49 has bearings. The bearing 49 comprises an inner ring, an outer ring and rolling elements arranged between the inner ring and the outer ring. The inner ring is integral with the pivot shaft and the outer ring is integral with an inner surface 54 of the housing 48. The rolling elements can be balls or rollers.

Anti-vibration means 55 for damping vibration of the pivot shaft 42 are also housed in the housing 48 so as to participate in the mechanical strength of the stator vane 23 and to limit the propagation of vibrations. The anti-vibration means 55 are housed between an inner surface of the housing 48 and the guide bearing 49. In particular, the anti-vibration means 55 advantageously comprise an annulus of elastic material which is centered on the pivot axis B of the pivot shaft 42. The elastic material may comprise an elastomer such as a rubber.

As can be seen in FIG. 2, the retaining member 37 is also supported by a plurality of arms 50 to improve the mechanical strength of the stator vanes 23. Advantageously, the inlet casing 16 constitutes the fixed structure. In the present example, there are three arms 50 that are evenly distributed about the longitudinal axis X. The arms 50 extend substantially radially between the retaining member 37 and the inlet casing 16. Each arm advantageously, but not limitatively, has an aerodynamic shape with an upstream edge 50a and a downstream edge 50b that are axially opposed and that each connect a first surface and a second surface that are transversely opposed. The upstream edge 50a of the arms 50 extends radially away from the trailing edge 26b so as to ensure that each blade 24 can pivot. Each arm 50 further includes a first end 51 that is attached to the inlet casing 16. Advantageously, the first end 51 is attached to a shell of the inlet casing 16. Advantageously, but not limitatively, the first end 51 is fixed by means of fixing elements such as screws, nuts, bolts or any other element allowing easy mounting and/or dismounting thereof. Each arm 50 also includes a second end 52 that is attached to the retaining member 37. The second end 52 is radially opposite the first end 51. The second end 52 may also be secured by fasteners such as screws, nuts, bolts or glue or welding. Alternatively, the arms and the retaining member 37 are formed in one piece (from one material). Preferably, the bottoms 50 are each hollow.

As can be seen in FIG. 2 and partly in FIG. 3, a de-icing device 60 is also provided to prevent ice from forming at least at the pivot connection between the blades 24 and the retaining member 37. The pivoting of the stator vanes 23 is then guaranteed under all circumstances. The de-icing device 60 is designed to take hot air from the primary vein 20 and distribute it to the retaining means (retaining member 37 and arm 50) of the stator vanes 23. The hot air is taken in particular from the low-pressure compressor 5 which raises the temperature of the air flow entering the turbine engine.

According to the example shown in FIG. 2, the de-icing device 60 comprises a hot air conveying pipe 61 with a first end 62 opening into the primary vein 20. The device 60 comprises a control valve 63 which is disposed on the pipe 61 to control the flow rate of hot air flow to be taken and to regulate the flow rate. The valve 63 is disposed downstream of the first end 62 along the direction of flow of the hot air flow in the pipe 61.

The pipe 61 comprises in particular a first portion 61a which is connected to the first end 62 and which runs inside at least one arm 50. The pipe 61 includes a second portion 61b that is connected to the first portion 61a. The second portion 61b travels within the retaining member 37 along a circumferential direction. Finally, the pipe 61 includes a third portion 61c which is connected on the one hand to the second portion 61b and which is connected on the other hand to a second end of the pipe 61 which opens in the vicinity of the pivot shaft 42. The second portion 61b distributes hot air to all the housings 48 of the retaining member. In FIG. 2, the pipe 61 includes an annulus portion 61d that surrounds each housing 48. In this case, the second end of the pipe 61 opens into the third portion 61c of the pipe 61 that is in the retaining member 37.

Figure 5:
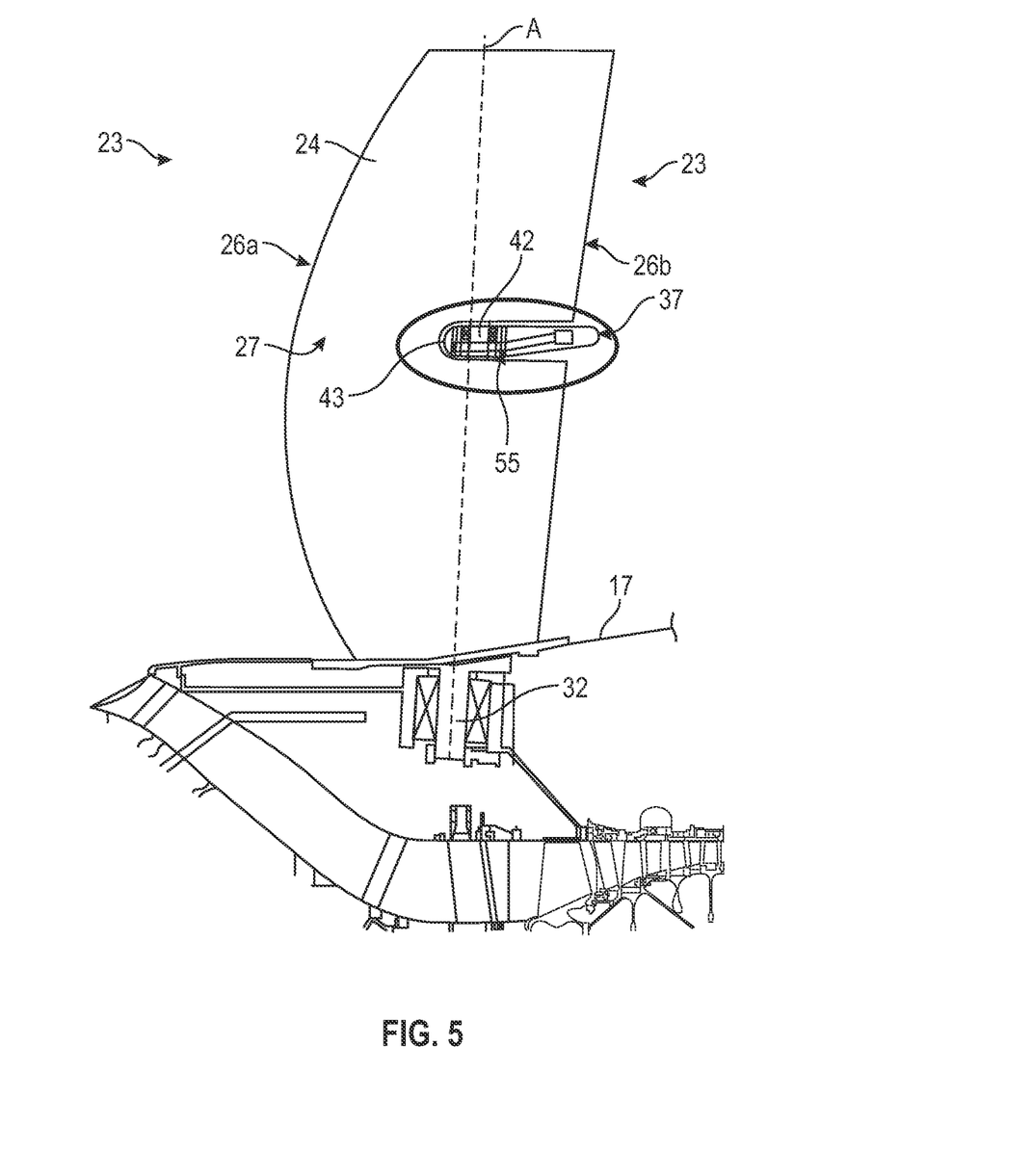
FIG. 5 shows, in partial and axial section, another example of an embodiment of means for retaining a flow straightener mounted downstream of a propeller of a turbine engine module according to the invention.

Another embodiment of the flow straightener 3 installed downstream of the propeller 2 is illustrated in FIG. 5. The stator vanes 23 of the flow straightener 3 are also held at least in part by retaining means comprising at least one retaining member 37. The blades 24 of the stator vanes comprise for this purpose, at least in part, a notch 43 opening into the trailing edge thereof. The elements identical or substantially identical to those presented above and/or with the same functions are represented by the same numerical references. The difference with the previous embodiment of FIGS. 1 to 3, is that the retaining means 37 are devoid of arms extending radially between the outer casing and the retaining member. In this case, the retaining member 37 is annular, extends about the longitudinal axis, and passes through the notches 43 of all the blades 24 of the stator vanes circumferentially. A pivot shaft extends radially through each notch 43. The blades 24 each pivot at their roots and at the pivot shaft 42 located midway up the blade. In particular, the pivot shaft passes through the housing 48 which is advantageously equipped with anti-vibration means 55.

Figure 6:
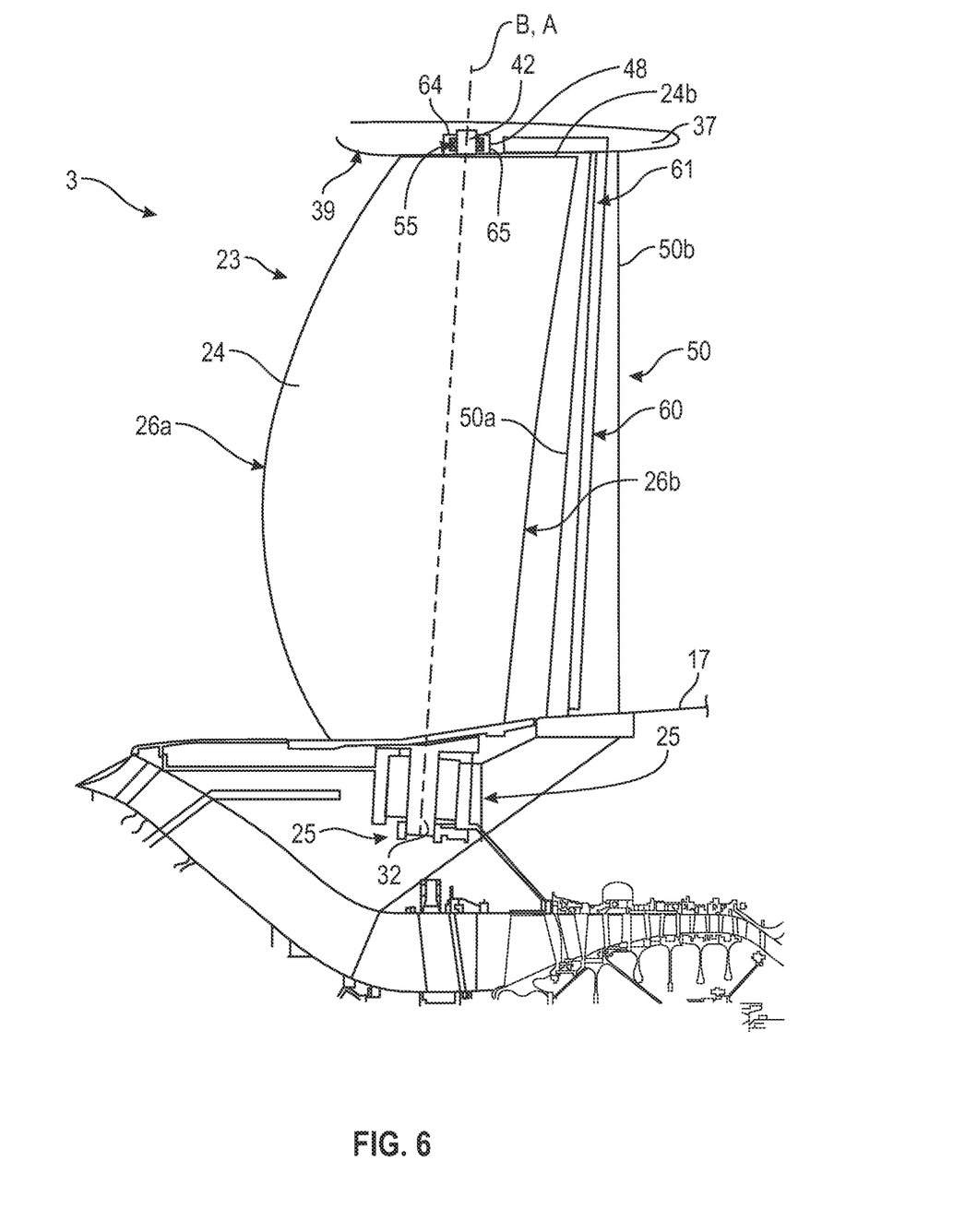
FIG. 6 illustrates in partial axial section yet another example of an embodiment of means for retaining a flow straightener mounted downstream of a propeller of a turbine engine module according to the invention.

FIG. 6 shows yet another embodiment of the flow straightener 3 installed downstream of the propeller 2. The stator vanes 23 of the flow straightener 3 are also retained at least in part by at least retaining means. The elements identical or substantially identical to those presented above and/or with the same functions are represented by the same numerical references. In the present example, the retaining means comprise at least one arm 50 and at least one retaining member 37 that is carried by the arm 50. A pivot shaft 42 is arranged at the free radially outer end 24b of at least one blade 24 of the stator vanes 23. Here, all blades are provided with a pivot shaft 42 extending radially outward and from the radially outer end 24b. In this case, the retaining member 37 is also mounted at the radially outer end 24b of the blades 24 of the stator vanes 23 and extends circumferentially between at least two adjacent vanes. Advantageously, the retaining member is annular (360°) and extends about the longitudinal axis X. The retaining member comprises several housings 48 each with a bottom 64 and an opening 65 that opens onto the inner surface 39 of the retaining member 37. In other words, the housings are not through-going. Each housing 48 is arranged regularly in the retaining member 37 along the circumferential direction and so as to face a corresponding pivot shaft 42. The anti-vibration means 55 and the rotational guide bearing 49 are accommodated in each housing 48. Several arms 50 extend radially between the retaining member 37 and the outer casing 17. These also extend at an axial distance from the stator vanes and in particular from the trailing edges 26b. A de-icing device 60 also equips the retaining means. More precisely, the pipe 61 of the de-icing device 60, a portion of which is fitted to the arms 50, extends up into the retaining member 37 in the upper part of the stator vane 23. Thus, the stator vanes 23 are held at their root 25 and radially outer ends 27b (head of the vane) and can pivot easily, while being damped and in all circumstances.

The invention claimed is:

1. A turbine engine module with a longitudinal axis X, comprising:
    an unducted propeller intended to be driven in rotation about the longitudinal axis X,
    at least one flow straightener comprising a plurality of stator vanes extending substantially along a radial axis Z, each stator vane comprising a root and a blade rising radially from the root, and
    a system for changing a pitch of the blades of the stator vanes each about a pitch axis A that passes through the root of a stator vane,
    wherein at least two adjacent stator vanes are connected to each other by at least one retaining member which is coupled to the blades of the stator vanes by at least one pivot shaft and which is mounted radially at a distance from the roots of the stator vanes, said at least one pivot shaft extending along a pivot axis B coaxial with one of said pitch axes A and being intended to allow the stator vanes to pivot about the pivot axis B, each stator vane comprises a notch formed in the blade and opening onto a trailing edge of the blade, the retaining member and said at least one pivot shaft extending inside the notch, and in that the turbine engine module comprises anti-vibration means for damping vibration of the at least one pivot shaft, and wherein the at least one pivot shaft is distinct from one of the roots around which the blade rotates.

2. The turbine engine module according to claim 1, wherein the at least one retaining member comprises at least one housing in which the at least one pivot shaft is mounted, at least one guide bearing for the rotation of the at least one pivot shaft, and the anti-vibration means which are arranged between an inner surface of the at least one housing and the at least one guide bearing.

3. The turbine engine module according to claim 1, wherein the anti-vibration means comprise an elastic annulus centered on the pivot axis B of the at least one pivot shaft.

4. The turbine engine module according to claim 1, wherein the pitch axis A is inclined with respect to the radial axis Z.

5. The turbine engine module according to claim 1, wherein the at least one pivot shaft passes at least in part through the blade of one of the stator vanes along the pitch axis A.

6. The turbine engine module according to claim 1, wherein the at least one pivot shaft is arranged at a radially outer end of one of the blades.

7. The turbine engine module according to claim 1, wherein the at least one retaining member is annular and extends about the longitudinal axis X.

8. The turbine engine module according to claim 1, wherein the at least one retaining member is connected to an inlet casing of the turbine engine module by a plurality of arms that are distributed about the longitudinal axis X.

9. The turbine engine module according to claim 1, wherein the turbine engine module comprises a de-icing device for at least the pivot axis B of the at least one pivot shaft, the de-icing device comprising at least one hot air conveying pipe intended to take hot air from a primary vein of the turbine engine, the conveying pipe extending at least partly inside the at least one retaining member.

10. An aircraft turbine engine comprising at least one turbine engine module according to claim 1.

11. The turbine engine module according to claim 1, wherein said flow straightener is unducted.

12. The turbine engine module according to claim 1, wherein the retaining member has an aerodynamic cross-sectional shape.

13. The turbine engine module according to claim 1, wherein each notch is located halfway up the blade along the radial axis.

14. The turbine engine module according to claim 1, wherein the retaining member extends circumferentially between adjacent stator vanes and between adjacents notches.

15. The turbine engine module according to claim 1, wherein the flow straightener is installed downstream of the propeller.

16. A turbine engine module with a longitudinal axis X, comprising:
an unducted propeller intended to be driven in rotation about the longitudinal axis X,
at least one flow straightener installed downstream of the propeller and comprising a plurality of stator vanes extending substantially along a radial axis Z, each stator vane comprising a root and a blade rising radially from the root, and
a system for changing a pitch of the blades of the stator vanes each about a pitch axis A that passes through the root of a stator vane,
wherein at least two adjacent stator vanes are connected to each other by at least one retaining member which is coupled to the blades of the stator vanes by at least one pivot shaft and which is mounted radially at a distance from the roots of the stator vanes to the level of the radially outer ends of the blades, said at least one pivot shaft extending along a pivot axis B coaxial with one of said pitch axes A and being intended to allow the stator vanes to pivot about the pivot axis B,
wherein the turbine engine module comprises anti-vibration means for damping vibration of the at least one pivot shaft and a plurality of arms extending radially between the retaining member and an inlet casing of the turbine engine module,
wherein the at least one pivot shaft is distinct from one of the roots around which the blade rotates, and
wherein the arms are distributed about the longitudinal axis X and comprising a portion of a pipe fitted to one of said arms, said portion of pipe extending until the retaining member.

* * * * *